United States Patent [19]
Adams, Jr. et al.

[11] Patent Number: 5,506,619
[45] Date of Patent: Apr. 9, 1996

[54] ADAPTIVE COLOR PLAN INTERPOLATION IN SINGLE SENSOR COLOR ELECTRONIC CAMERA

[75] Inventors: James E. Adams, Jr.; John F. Hamilton, Jr., both of Rochester, N.Y.

[73] Assignee: Eastman Kodak Company, Rochester, N.Y.

[21] Appl. No.: 407,436

[22] Filed: Mar. 17, 1995

[51] Int. Cl.$^6$ ..................................................... H04N 9/07
[52] U.S. Cl. ........................... 348/272; 348/266; 348/277
[58] Field of Search ............................... 348/266, 242, 348/273, 272, 276, 277; H04N 9/07

[56] References Cited

U.S. PATENT DOCUMENTS

| | | | |
|---|---|---|---|
| 3,971,065 | 7/1976 | Bayer | 358/41 |
| 4,642,678 | 2/1987 | Cok | 358/44 |
| 4,716,455 | 12/1987 | Ozawa et al. | 358/44 |
| 4,796,085 | 1/1989 | Shinada | 358/75 |
| 5,008,739 | 4/1991 | D'Luna et al. | 358/21 R |
| 5,373,322 | 12/1994 | Laroche et al. | 348/273 |
| 5,382,976 | 1/1995 | Hibbard | 348/273 |

*Primary Examiner*—James J. Groody
*Assistant Examiner*—Glenton B. Burgess
*Attorney, Agent, or Firm*—Raymond L. Owens

[57] ABSTRACT

Apparatus is described for processing a digitized image signal obtained from an image sensor having color photosites aligned in rows and columns that generate at least three separate color values but only one color value for each photosite location, a structure is provided which interpolates color values for each photosite location so that it has three different color values. The apparatus includes an image buffer for storing the digitized image signal and a processor operative with the buffer storing means for generating an appropriate color value missing from a photosite location by the interpolation of an additional color value for such photosite locations from color values of different colors than the missing color value at nearby photosite locations. The processor further includes a structure for obtaining Laplacian second-order values in at least two image directions from nearby photosites of the same column and row and which structure is responsive to the Laplacian second-order values for selecting a preferred orientation for the interpolation of the missing color value and for interpolating the missing color value from nearby multiple color values selected to agree with the preferred orientation.

10 Claims, 3 Drawing Sheets

ADAPTIVE COLOR PLAN INTERPOLATION IN SINGLE SENSOR COLOR ELECTRONIC CAMERA

CROSS REFERENCE TO RELATED APPLICATIONS

Reference is made to commonly assigned U.S. Ser. No. 08/407,423 filed Mar. 17, 1995, to John F. Hamilton, Jr. and James E. Adams, Jr. filed concurrently herewith, the teachings of which are incorporated herein.

FIELD OF INVENTION

This invention relates to the field of electronic imaging and is particularly suitable to electronic still imaging by means of an electronic still camera having a single color sensor and memory.

BACKGROUND OF THE INVENTION

In electronic color imaging, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of sensors that are covered by a pattern of red, green and blue filters. This type of sensor is known as a color filter array or CFA. Below is shown the red (R), green (G) and blue (B) pixels as are commonly arranged on a CFA sensor.

When a color image is captured using a CFA, it is necessary to interpolate the red, green and blue values so that there is an estimate of all three color values for each sensor location. Once the interpolation is done, each picture element, or pixel, has three color values and can be processed by a variety of known image processing techniques depending on the needs of the system. Some examples of the reasons for processing are to do image sharpening, color correction or halftoning.

The following shows how red green and blue pixels can be arranged in a color filter array. For a more detailed description see U.S. Pat. No. 3,971,065 to Bayer.

```
G R G R
B G B G
G R G R
B G B G
```

SUMMARY OF INVENTION

The object of this invention is to provide an improved apparatus for estimating the missing pixel values in a CFA.

This object is achieved in apparatus for processing a digitized image signal obtained from an image sensor having color photosites aligned in rows and columns that generate at least three separate color values but only one color value for each photosite location, means for interpolating color values for each photosite location so that it has three different color values comprising:

means for storing the digitized image signal;

a processor operative with said storing means for generating an appropriate color value missing from a photosite location by the interpolation of an additional color value for such photosite locations from color values of different colors than the missing color value at nearby photosite locations, said processor including means for obtaining Laplacian second-order values in at least two image directions from nearby photosites of the same column and row;

means responsive to the Laplacian second-order values for selecting a preferred orientation for the interpolation of the missing color value; and means for interpolating the missing color value from nearby multiple color values selected to agree with the preferred orientation.

The advantages of this invention are 1) a richer set of neighborhood classifications provides the needed degrees of freedom to properly reconstructed difficult picture elements, such as specular highlights, that the previous approaches handled less satisfactorily; and 2) is computationally efficient both in execution time and memory storage requirements.

DETAILED DESCRIPTION OF THE INVENTION

Since single-sensor electronic cameras employing color filter arrays are well known, the present description will be directed in particular to elements forming part of, or cooperating more directly with, apparatus and method in accordance with the present invention. Elements not specifically shown or described herein may be selected from those known in the art.

Figure 1:
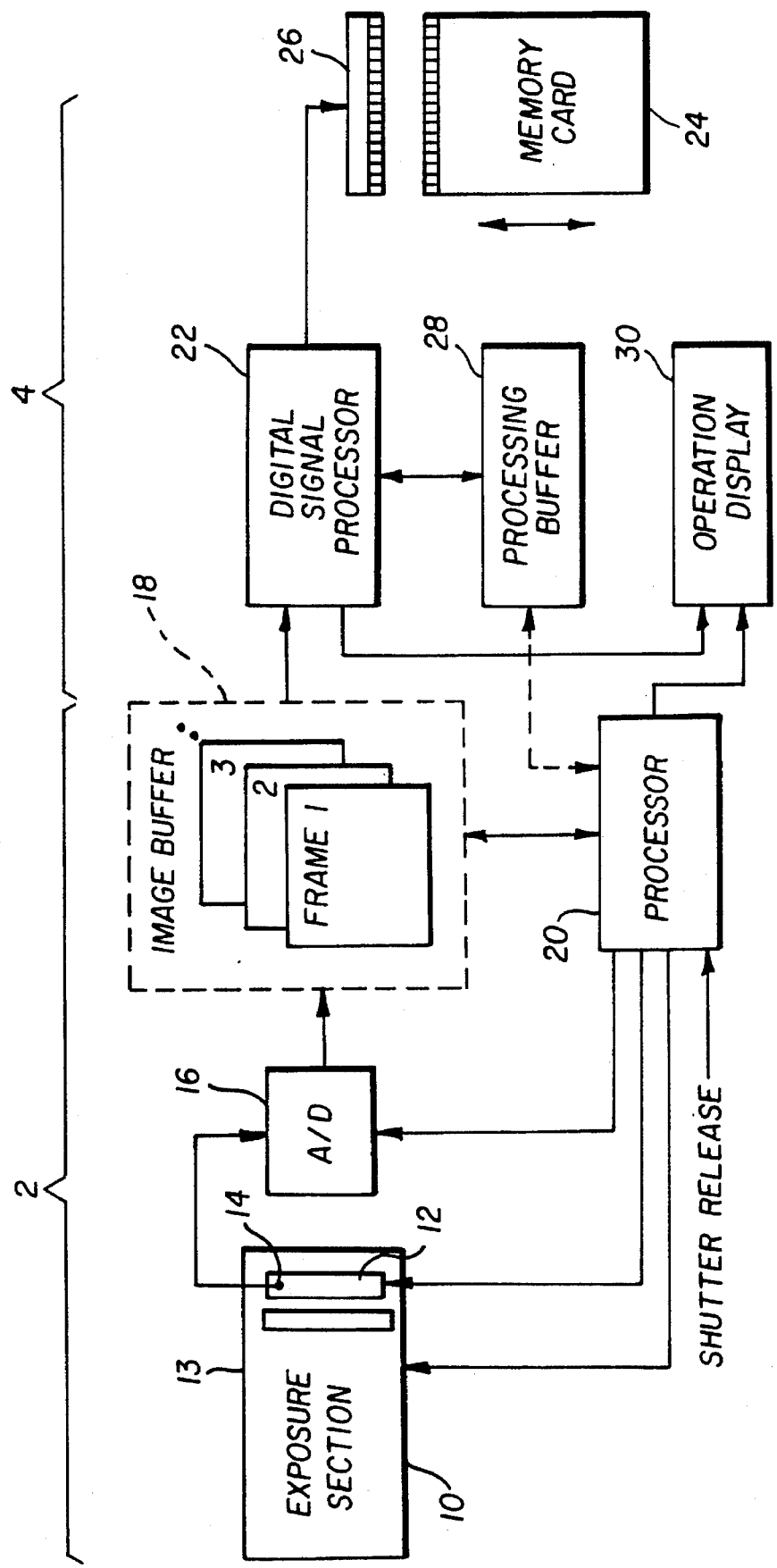
FIG. 1 is a block diagram of an electronic still camera employing interpolation processing according to the invention.
Figure 2:
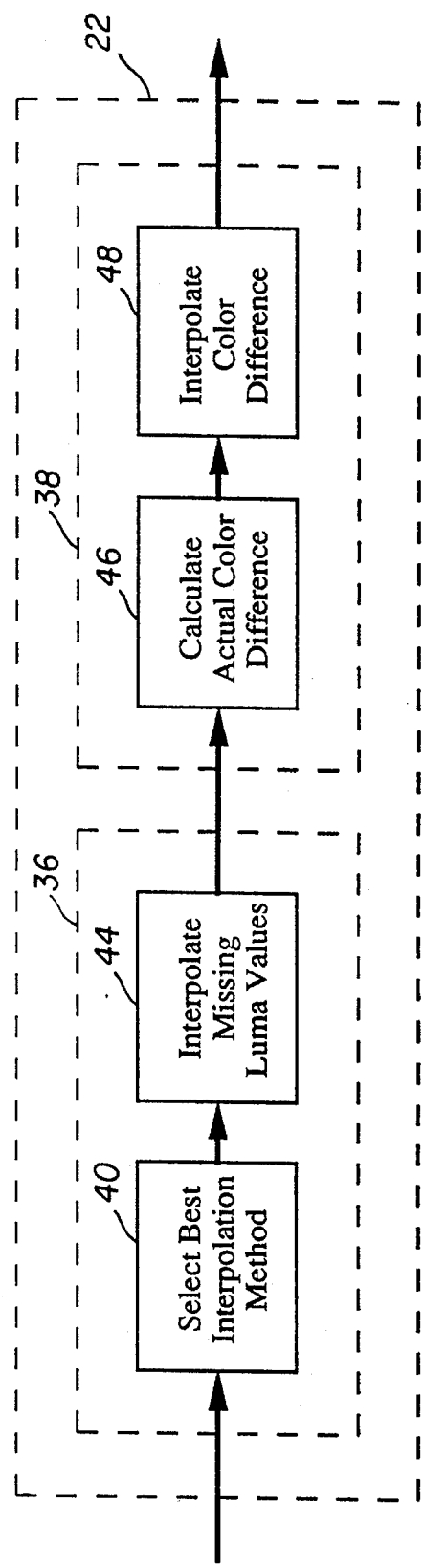
FIG. 2 is a block diagram of the logic of the interpolation processing technique used in connection with the invention.

Referring initially to FIGS. 1 and 2, an electronic still camera is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of photosites corresponding to picture elements of the image, is a conventional charge-coupled device (CCD) using either well-known interline transfer or frame transfer techniques. The image sensor 12 is covered by a color filter array (CFA) 13, known as the Bayer array, which is described in U.S. Pat. No. 3,971,065 and herewith incorporated by reference. In the Bayer geometry each color covers a photosite, or picture element (pixel), of the sensor. In particular, chrominance colors (red and blue) are interspersed among a checkerboard pattern of luminance colors (green). The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element. The digital signals are applied to an image buffer 18, which may be a random access memory (RAM) with storage capacity for a plurality of still images.

A control processor 20 generally controls the input section 2 of the camera by initiating and controlling exposure (by operation by the diaphragm and shutter (not shown) in the exposure section 10), by generating the horizontal and vertical clocks needed for driving the image sensor 12 and for clocking image information therefrom, and by enabling the A/D converter 16 in conjunction with the image buffer 18 for each signal segment relating to a picture element. (The control processor 20 would ordinarily include a microprocessor coupled with a system timing circuit.) Once a certain number of digital image signals have been accumulated in the image buffer 18, the stored signals are applied to a digital signal processor 22, which controls the throughput processing rate for the interpolation and recording section 4 of the camera. The digital signal processor 22 applies an interpolation algorithm to the digital image signals, and sends the interpolated signals to a conventional, removable memory card 24 via a connector 26.

Since the interpolation and related processing ordinarily occurs over several steps, the intermediate products of the processing algorithm are stored in a processing buffer 28. (The processing buffer 28 may also be configured as part of the memory space of the image buffer 18.) The number of image signals needed in the image buffer 18 before digital processing can begin depends on the type of processing, that is, for a neighborhood interpolation to begin, a block of signals including at least a portion of the image signals comprising a video frame must be available. Consequently, in most circumstances, the interpolation may commence as soon as the requisite block of picture elements is present in the buffer 18.

The input section 2 operates at a rate commensurate with normal operation of the camera while interpolation, which may consume more time, can be relatively divorced from the input rate. The exposure section 10 exposes the image sensor 12 to image light for a time period dependent upon exposure requirements, for example, a time period between 1/1000 second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the camera. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of camera is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2; that is, first, the high frequency information for the "missing green" pixels (i.e., the red and blue pixel locations) are interpolated to improve the luminance rendition and, secondly, the color difference information is interpolated at the high frequency locations by bilinear methods to generate the other colors of the CFA pattern. In the implementation shown in FIG. 2, an adaptive interpolation technique is used in the luminance section 36 for optimizing the performance of the system for images with horizontal and vertical edges. "Missing green" pixels are adaptively interpolated either horizontally, vertically or two-dimensionally depending upon the gradient established between the chrominance (red and blue) pixel locations in the vertical and horizontal directions around the "missing green" pixel.

Figure 3:
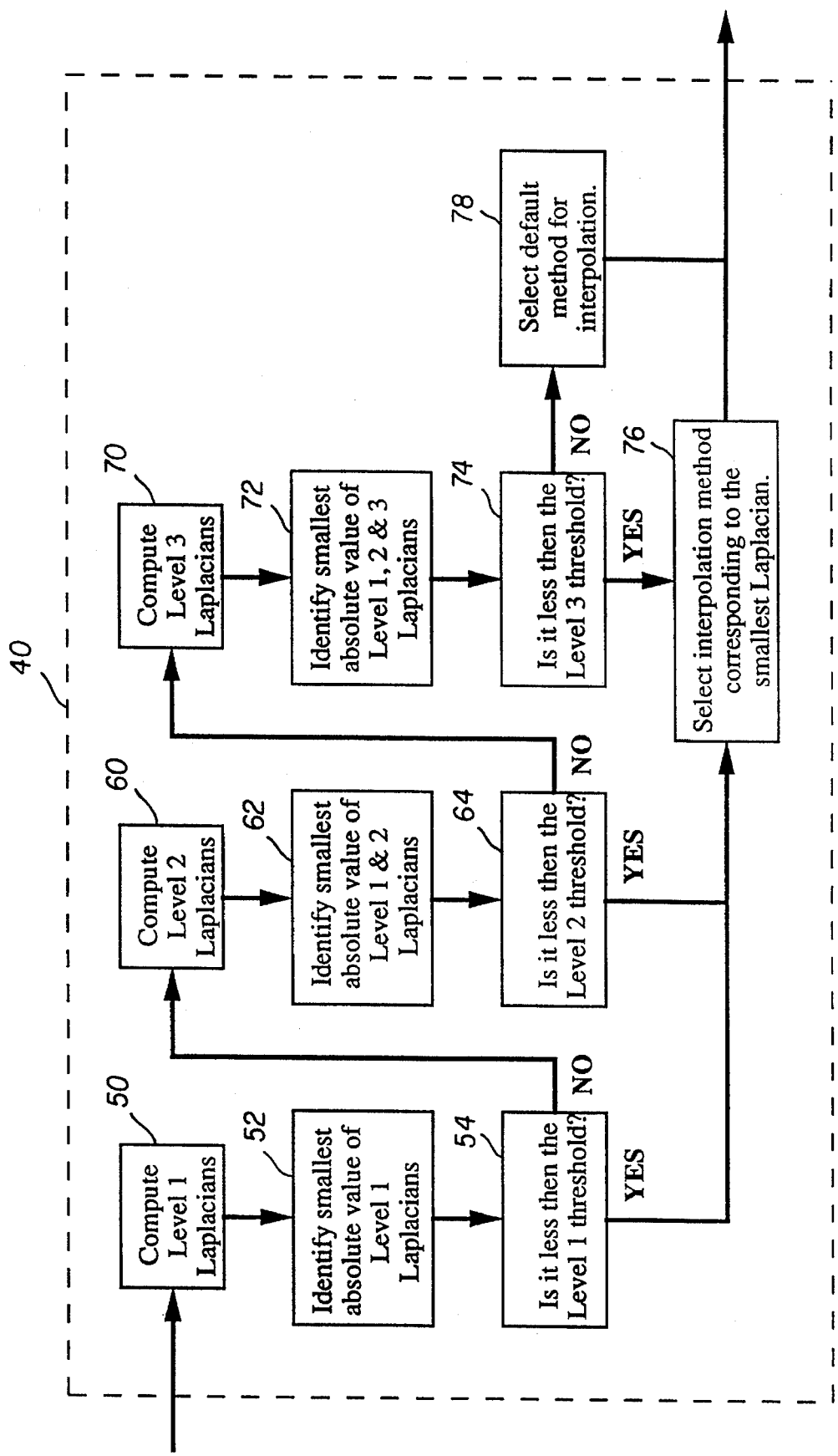
FIG. 3 is a detailed block diagram of the logic of the interpolation luminance section in FIG. 2.

The first step for adaptively interpolating the "missing green" pixels is to select an interpolation method. The details of this process are shown in Block 40 of FIG. 3. All told, there are ten Laplacians which are divided into Levels 1, 2 and 3. The Level 1 Laplacians correspond to interpolation methods which are most likely to be successful. Similarly, Level 2 Laplacians correspond to the next most likely method, and so on. The default method is the least likely to be used. The Laplacians are investigated in this order so that the most likely conditions can be accepted early in the process and, hence, keep the average processing time to a minimum.

The process starts by computing Level 1 Laplacians (Block 50) and then finding which of them has the smallest absolute value (Block 52). This value is then compared (Block 54) to the Level 1 threshold value (60 works well) to see if its corresponding method should be selected. If the value is less than the threshold, the corresponding method is selected (Block 76) and Block 40 is done. If the value is greater than or equal to the threshold, then the Level 2 Laplacians are computed (Block 60). The smallest absolute value is then found among both Level 1 and 2 Laplacians (Block 62). This value is then compared (Block 64) to the Level 2 threshold (170 works well) to see if its corresponding method should be selected. If the value is less than the threshold, the corresponding method is selected (Block 76) and Block 40 is done. If the value is greater than or equal to the threshold, then the Level 3 Laplacians are computed (Block 70). Again the smallest absolute value is found among Level 1, 2 and 3 Laplacians (Block 72). This value is compared (Block 74) to the Level 3 threshold (250 works well) to see if its corresponding method should be selected. If the value is less than the threshold, the corresponding method is selected (Block 76) and Block 40 is done. If the value is greater than or equal to the threshold, then the default interpolation method is selected (Block 78) and Block 40 is done.

Figure 4:
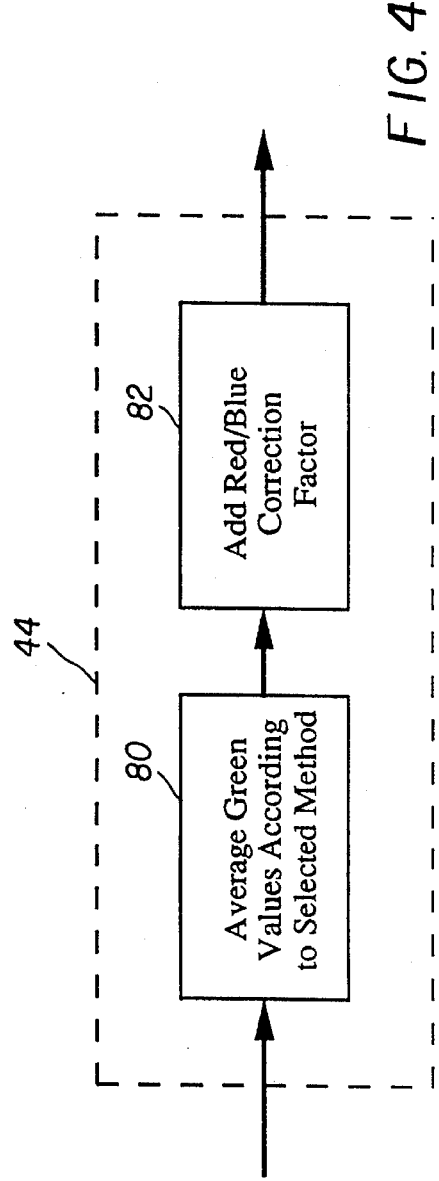
FIG. 4 is a more detailed block diagram of the logic of the chrominance section in FIG. 2.

The interpolation step (Block 44) has two parts, as shown in FIG. 4. The first part (Block 80) averages the two luminance (green) values corresponding to the selected interpolation method. The second part (Block 82) adds a correction factor based on either red or blue neighboring values depending on if the pixel in question was covered by a red or blue filter in the Bayer color filter array.

The color difference is calculated in a chroma section 38 by substracting the interpolated green value at each chrominance pixel location (Block 46) from the actual color pixel for that location. Finally, the color difference data for each luminance pixel location is interpolated using two-dimensional bilinear interpolation in the Block 48. The data at this point may be reconstructed into its original components (RGB) or left as color-difference signals for further processing.

More specifically, the following is a detailed description of the operation of the digital signal processor for a specific example using the Bayer array.

Green Plane Reconstruction

Consider the partial 5×5 pixel neighborhood below:

```
        R1
        G2
R3 G4 R5 G6 R7
        G8
        R9
```

We wish to predict G5. Assume that the relationship $$G_i - R_i = \text{constant}$$

is approximately true over the 5×5 region. The following are two predictors of G5:

$$G5-R5=(G4-R4+G6-R6)/2 \quad \text{(EQ 1)}$$

$$G5-R5=(G2-R2+G8-R8)/2 \quad \text{(EQ 2)}$$

Extending this idea, there are nine other predictors that use the information from the central 3×3 region within the neighborhood:

$$G5-R5=(G2-R2+G6-R6)/2 \quad \text{(EQ 3)}$$

$$G5-R5=(G6-R6+G8-R8)/2 \quad \text{(EQ 4)}$$

$$G5-R5=(G8-R8+G4-R4)/2 \quad \text{(EQ 5)}$$

$$G5-R5=(G4-R4+G2-R2)/2 \quad \text{(EQ 6)}$$

$$G5-R5=G2-R2 \quad \text{(EQ 7)}$$

$$G5-R5=G6-R6 \quad \text{(EQ 8)}$$

$$G5-R5=G8-R8 \quad \text{(EQ 9)}$$

$$G5-R5=G4-R4 \quad \text{(EQ 10)}$$

$$G5-R5=(G2-R2+G6-R6+G8-R8+G4-R4)/4 \quad \text{(EQ 11)}$$

In all these cases the problem is that R2, R4, R6 and R8 are unknown. In accordance with the present invention, we assume that the spatial information in the red layer is less visually important than in the green layer. We replace R2, R4, R6 and R8 with the simple approximations:

$$R2=(R1+R5)/2 \quad \text{(EQ 12)}$$

$$R4=(R3+R5)/2 \quad \text{(EQ 13)}$$

$$R6=(R5+R7)/2 \quad \text{(EQ 14)}$$

$$R8=(R5+R9)/2 \quad \text{(EQ 15)}$$

Substituting (12) through (15) into (1) through (11) and rearranging produces the following predictors:

$$G5=(G4+G6)/2+(2R5-R3-R7)/4 \quad \text{(EQ 16)}$$

$$G5=(G2+G8)/2+(2R5-R1-R9)/4 \quad \text{(EQ 17)}$$

$$G5=(G2+G6)/2+(2R5-R1-R7)/4 \quad \text{(EQ 18)}$$

$$G5=(G6+G8)/2+(2R5-R7-R9)/4 \quad \text{(EQ 19)}$$

$$G5=(G4+G8)/2+(2R5-R3-R9)/4 \quad \text{(EQ 20)}$$

$$G5=(G2+G4)/2+(2R5-R1-R3)/4 \quad \text{(EQ 21)}$$

$$G5=G2+(R5-R1)/2 \quad \text{(EQ 22)}$$

$$G5=G6+(R5-R7)/2 \quad \text{(EQ 23)}$$

$$G5=G8+(R5-R9)/2 \quad \text{(EQ 24)}$$

$$G5=G4+(R5-R3)/2 \quad \text{(EQ 25)}$$

$$G5=(G2+G4+G6+G8)/4+(4R5-R1-R3-R7-R9)/8 \quad \text{(EQ 26)}$$

The red "correction" terms are actually Laplacian second derivative operators in (16) through (21) and (26) and first derivative operators in (22) through (25).

It should be noted that if Rs and Bs are swapped in our 5×5 neighborhood, then simply substituting Bs for Rs in (16) through (26) provides the required predictors.

The remaining task is to pick the best, or at least an acceptably good, predictor for a given neighborhood. The following approach is used in accordance with this invention.

First, the red correction terms for (16) and (17) are calculated. If the terms with the smaller absolute value is less than a given threshold (we use 69 in 8 bit log space), then the corresponding predictor is used. Refer to the pseudo code below.

```
D16 = 2 * R5 - R3 - R7
D17 = 2 * R5 - R1 - R9
IF (|D16| <= |D17| AND
|D16| < FT) /* FT = 69 works well */
    G5 = (G4 + G6)/2 + D16/4
ELSE IF (|D17| < |D16| AND |D17| < FT)
    G5 = (G2 + G8)/2 + D17/4
ELSE
```

If both tests fail, the next "set" of corrections is calculated, i.e., the red terms for (18) through (21). If the smallest of the absolute value of these terms is less than a given threshold (we use 170 in 8 bit log space), then the corresponding predictor is used. See below:

```
D18 = 2 * R5 - R1 - R7
D19 = 2 * R5 - R7 - R9
D20 = 2 * R5 - R3 - R9
D21 = 2 + R5 - R1 - R3
IF (|D18| <= |D19| AND
|D18| <= |D20| AND |D18| <= |D21| AND
|D18| < ET) /* ET = 170 works well */
    G5 = (G2 + G6)/2 + D18/4
ELSE IF (|D19| <= |D20| AND
|D19| <= |D21| AND |D19| < ET)
    G5 = (G6 + G8)/2 + D19/4
ELSE IF (|D20| <= |D21| AND |D20| < ET)
    G5 = (G4 + G8)/2 + D20/4
ELSE IF (|D21| < ET)
```

$$G5 = (G2 + G4)/2 + D21/4$$
$$\text{ELSE}$$

If a pixel has failed all of the tests so far, red correction terms for (22) through (25) are calculated and tested against a given threshold value. (We use 250 in 8 bit log space.) If the minimum absolute value correction passes that threshold, its corresponding predictor is used. See below:

```
D22 = R5 - R1
D23 = R5 - R7
D24 = R5 - R9
D25 = R5 - R3
IF (|D22| <= |D23| AND |D22| <= |D24| AND
    |D22| <= |D25| AND
    |D22| < CT) /* CT = 250 works well */
    G5 = G2 + D22/2
ELSE IF (|D23| <= |D24| AND
    |D23| <= |D25| AND |D23| < CT)
    G5 = G6 + D23/2
ELSE IF (|D24| <= |D25| AND |D24| < CT)
    G5 = G8 + D24/2
ELSE IF (|D25| < CT)
    G5 = G4 + D25/2
ELSE
```

Finally, if all tests have failed, predictor (26) is used.

Red and Blue Plane Reconstruction

Consider the 3×3 neighborhood below.

R1 G2 R3
G4 B5 G6
R7 G8 R9

All greens are known. We again assume $G_i - R_i = \text{constant}$ is approximately true over the 3×3 neighborhood. Due to the sparser initial data availability, fewer predictors are generally evident. Consider R2:

$$R2 - G2 = (R1 - G1 + R3 - G3)/2 \quad (EQ\ 27)$$

$$R2 - G2 = R1 - G1 \quad (EQ\ 28)$$

$$R2 - G2 = R3 - G3 \quad (EQ\ 29)$$

which, when rearranged give $$R2 - G2 = (R1 + R3)/2 + (2G2 - G1 - G3)/2 \quad (EQ\ 30)$$

$$R2 = R1 + (G2 - G1) \quad (EQ\ 31)$$

$$R2 = R3 + (G2 - G3) \quad (EQ\ 32)$$

Analogously for R4:

$$R4 = (R1 + R7)/2 + (2G4 - G1 - G7)/2 \quad (EQ\ 33)$$

$$R4 = R1 + (G4 - G1) \quad (EQ\ 34)$$

$$R4 = R7 + (G4 - G7) \quad (EQ\ 35)$$

If we predict R2, R4, R6 and R8 first, we may use them to predict R5 as in (16) through (26). Note the change in the correction term denominators:

$$R5 = (R4 + R6)/2 + (2G5 - G4 - G6)/2 \quad (EQ\ 36)$$

$$R5 = (R2 + R8)/2 + (2G5 - G2 - G8)/2 \quad (EQ\ 37)$$

$$R5 = (R2 + R6)/2 + (2G5 - G2 - G6)/2 \quad (EQ\ 38)$$

$$R5 = (R6 + R8)/2 + (2G5 - G6 - G8)/2 \quad (EQ\ 39)$$

$$R5 = (R4 + R8)/2 + (2G5 - G4 - G8)/2 \quad (EQ\ 40)$$

$$R5 = (R2 + R4)/2 + (2G5 - G2 - G4)/2 \quad (EQ\ 41)$$

$$R5 = R2 + (G5 - G2) \quad (EQ\ 42)$$

$$R5 = R6 + (G5 - G6) \quad (EQ\ 43)$$

$$R5 = R8 + (G5 - G8) \quad (EQ\ 44)$$

$$R5 = R4 + (G5 - G4) \quad (EQ\ 45)$$

$$R5 = (R2 + R4 + R6 + R8)/4 + (4G5 - G2 - G4 - G6 - G8)/4 \quad (EQ\ 46)$$

The blue plane reconstruction is done in an analogous manner.

The remaining question is the same as in the green plane: how to determine the best (or a sufficiently good) predictor for a given neighborhood.

For the case covered by (30) through (32), the following algorithm is used. Note that the threshold values are, again, for calculations done in 8 bit log space:

```
D30 = 2 * G2 - G1 - G3
IF (|D30| < FT) /* FT = 69 works well */
    R2 = (R1 + R3)/2 + D30/2
ELSE
    D31 = G2 - G1
    D32 = G2 - G3
    IF (|D31| < |D32|)
        R2 = R1 + D31
    ELSE
        R2 = R3 + D32
```

The use of (33) through (35) is similar. The use of (36) through (46) is the same as the use of (16) through (26).

The invention has been described in detail with particular reference to certain preferred embodiments thereof, but it will be understood that variations and modifications can be effected within the spirit and scope of the invention.

| | PARTS LIST |
|---|---|
| 2 | input section |
| 4 | recording section |
| 10 | exposure section |
| 12 | image sensor |
| 13 | color filter array |
| 14 | output diode |
| 16 | A/D converter |
| 18 | image buffer |
| 20 | control processor |
| 22 | digital signal processor |
| 24 | removable memory card |
| 26 | connector |
| 28 | processing buffer |
| 30 | display panel |
| 36 | luminance section |
| 38 | chroma section |
| 40 | block |
| 44 | block |
| 46 | block |
| 48 | block |
| 50 | block |
| 52 | block |
| 54 | block |
| 60 | block |
| 62 | block |
| 64 | block |
| 70 | block |
| 72 | block |
| 74 | block |
| 76 | block |
| 78 | block |
| 80 | block |

| PARTS LIST | |
|---|---|
| 82 | block |

We claim:

1. In apparatus for processing a digitized image signal obtained from an image sensor having color photosites aligned in rows and columns that generate at least three separate color values but only one color value for each photosite location, means for interpolating color values for each photosite location so that it has three different color values comprising:

means for storing the digitized image signal;

a processor operative with said storing means for generating an appropriate color value missing from a photosite location by the interpolation of an additional color value for such photosite locations from color values of different colors than the missing color value at nearby photosite locations, said processor including means for obtaining Laplacian second-order values in at least two image directions from nearby photosites of the same column and row;

means responsive to the Laplacian second-order values for selecting a preferred orientation for the interpolation of the missing color value; and means for interpolating the missing color value from nearby multiple color values selected to agree with the preferred orientation.

2. In apparatus for processing a digitized image signal obtained from an image sensor having red, green, and blue color photosites aligned in rows and columns that generate at least three separate color values but only one color value for each photosite location, means for interpolating color values for each photosite location so that it has three different color values comprising:

means for storing the digitized image signal;

a processor operative with said storing means for generating an appropriate color value missing from a photosite location by the interpolation of an additional color value for such photosite locations from color values of different colors than the missing color value at nearby photosite locations, said processor including means for obtaining Laplacian second-order values in at least two image directions from nearby photosites of the same column and row;

means responsive to the Laplacian second-order values for selecting a preferred orientation for the interpolation of the missing color value; and means for interpolating the missing color value from nearby multiple color values selected to agree with the preferred orientation wherein neighboring color values of the same color are averaged and corrected by neighboring color values of a different color value.

3. The apparatus of claim 1 wherein, when the preferred orientation is horizontal, a color site is red, and the missing color value is green, adjacent horizontal green color values are averaged and horizontal red color values including the red color site value provide the correction value.

4. The apparatus of claim 1 wherein, when the preferred orientation is horizontal, a color site is blue, and the missing color value is green, adjacent horizontal green color values are averaged and horizontal blue color values including the blue color site value provide the correction value.

5. The apparatus of claim 1 wherein, when the preferred orientation is horizontal, a color site is green, and the missing color value is red, adjacent horizontal red color values are averaged and horizontal green color values including the green color site value provide the correction value.

6. The apparatus of claim 1 wherein, when the preferred orientation is horizontal, a color site is green, and the missing color value is blue, adjacent horizontal blue color values are averaged and horizontal green color values including the green color site value provide the correction value.

7. The apparatus of claim 1 wherein, when the preferred orientation is vertical, a color site is red, and the missing color value is green, adjacent vertical green color values are averaged and vertical red color values including the red color site value provide the correction value.

8. The apparatus of claim 1 wherein, when the preferred orientation is vertical, a color site is blue, and the missing color value is green, adjacent vertical green color values are averaged and vertical blue color values including the blue color site value provide the correction value.

9. The apparatus of claim 1 wherein, when the preferred orientation is vertical, a color site is green, and the missing color value is red, adjacent vertical red color values are averaged and vertical green color values including the green color site value provide the correction value.

10. The apparatus of claim 1 wherein, when the preferred orientation is vertical, a color site is green, and the missing color value is blue, adjacent vertical blue color values are averaged and vertical green color values including the green color site value provide the correction value.

* * * * *